United States Patent [19]

Lee et al.

[11] Patent Number: 4,973,661

[45] Date of Patent: * Nov. 27, 1990

[54] PROCESS FOR FORMING END CAPPED POLYAMIC ACIDS POLYIMIDES

[75] Inventors: Burnell Lee; Hsueh M. Li, both of Baton Rouge, La.

[73] Assignee: Ethyl Corporation, Richmond, Va.

[ * ] Notice: The portion of the term of this patent subsequent to Sep. 11, 2007 has been disclaimed.

[21] Appl. No.: 357,237

[22] Filed: May 26, 1989

[51] Int. Cl.$^5$ .......................... C08G 8/02; C08C 69/26
[52] U.S. Cl. ................................... 528/353; 528/125; 528/126; 528/128
[58] Field of Search ................ 528/353, 125, 126, 128

[56] References Cited

U.S. PATENT DOCUMENTS

| | | |
|---|---|---|
| 3,179,630 | 4/1965 | Endrey ................................ 525/436 |
| 3,179,632 | 4/1965 | Hendrix ............................... 525/436 |
| 3,234,181 | 2/1966 | Olivier ................................. 528/182 |
| 3,748,311 | 7/1973 | Burns et al. ......................... 528/336 |
| 3,772,254 | 11/1973 | Jones et al. ......................... 524/194 |
| 3,975,363 | 8/1976 | Jones ................................... 526/259 |
| 4,173,700 | 11/1979 | Green et al. ........................ 528/125 |
| 4,244,853 | 1/1981 | Serafini et al. ...................... 525/432 |
| 4,552,931 | 11/1985 | St. Clair et al. .................... 525/432 |
| 4,742,153 | 5/1988 | Sutton, Jr. .......................... 528/353 |

*Primary Examiner*—Morton Foelak
*Assistant Examiner*—P. Hampton Hightower
*Attorney, Agent, or Firm*—Richard J. Hammond

[57] ABSTRACT

This invention discloses a process where a portion of an amine terminated polyamic acid intermediate is endcapped with an aromatic monoanhydride additionally substituted with a free carboxylic acid and a carboxylic ester. The polyamic acids of this invention are readily converted to high molecular weight polyimides.

14 Claims, No Drawings

PROCESS FOR FORMING END CAPPED POLYAMIC ACIDS POLYIMIDES

FIELD OF INVENTION

This invention relates to an improved process for preparing polyamic acids. More specifically, it relates to a process where a portion of an amine terminated polyamic acid intermediate is end capped with an aromatic monoanhydride additionally substituted with a free carboxylic acid and a carboxylic ester. The polyamic acids of this invention are readily converted to high molecular weight polyimides.

BACKGROUND OF INVENTION

Linear aromatic/heterocyclic condensation polyimides have been an item of commerce for almost two decades. The polymer systems that have seen the most commercial success include those usually described as the reaction products of aromatic tetraacids or derivatives with aromatic diamines. The acids are typically employed in their dianhydride or diester form. Because of the difficulty in shaping, coating or other processing of the polyimides produced from the above starting materials, it has been found to be more convenient to first form a solution of an intermediate reactant from the starting materials. This intermediate is termed a polyamic acid. The polyimide is then formed by concurrent solvent removal and thermal imidization which typically occurs at from about 150° C. to about 300° C. A representative general reaction employed to form the linear condensation polymers is shown below.

lyamic acid with dicarboxylated monoanhydrides. See for example U.S. Pat. No. 4,742,153. Thermal conversion of the end-capped polyamic acids converts these materials to polyimides through formation of an intermediate anhydride and subsequent chain extension of the end-capped polyamic acid. However, end-capped polyamic acids prepared by this process require high cure temperatures and long cure times.

SUMMARY

An improved process has now been discovered for making low viscosity, high solids solutions of polyamic acids useful for preparing polyimides having improved properties. More specifically, this invention involves forming a solution of an end-capped polyamic acid by contacting in a suitable solvent an aromatic diamine with a dianhydride of an aromatic tetracarboxylic acid and a monoanhydride of an aromatic polycarboxylic acid having one free terminal carboxylic acid and carboxylic acid ester moiety. The resulting polyamic acid will have a simple free carboxylic acid group and a simple free carboxylic ester. It can then be converted chemically or thermally to a polyimide at modest temperatures, i.e. above 120° C. By adjusting the mole percent of monoanhydride to be in excess of 2 mole % based on diamine, the resultant polyamic acid solution will exhibit a low viscosity and the polyimide product will display substantially all of the improved properties of homopolymer imides.

The novelty of this invention resides in the preparation and use of "end-capping" agents containing one carboxylic acid and one carboxylic ester and the finding

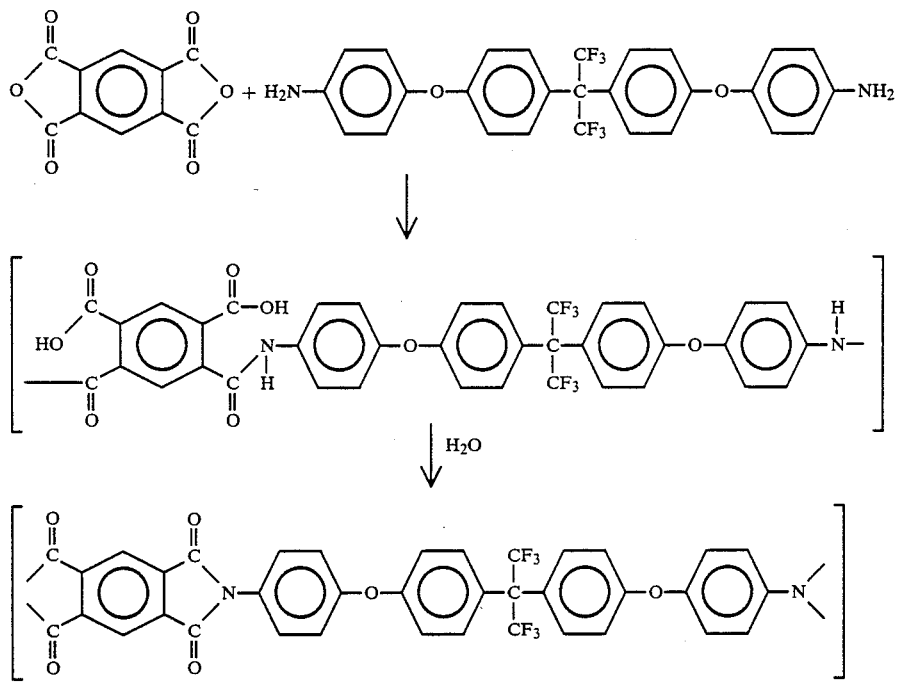

It is most cost effective to use high solids polyamic acid solutions in this process. Further, it is best to employ high molecular weight polyamic acids since the resultant polyimide products have improved properties. It has been previously known that high molecular weight polyimides can be made from low viscosity, high solids solution of polyamic acids by carboxylating, "end-capping," the terminal amino groups of the pothat the ester group of such end-capped polyamic acids reacts with the amine groups of the polyamic acid at moderately elevated temperatures. The end-capping is accomplished by reacting a certain proportion of the amine groups in the diamine with the free carboxylic acid, carboxylic acid ester-containing monoanhydride, as described in more detail below. By virtue of this end-capping, it is possible to keep the molecular weight of the polyamic acid temporarily at a level lower than normal. In the course of forming the polyimide and drying it, its molecular weight builds up in a final, moderately elevated temperature curing operation to give a polymer with properties equivalent to those for polymers made from a non-end-capped polyamic acid intermediate.

An advantage of this new process is that it allows preparation of easily processible high solids polyamic acids, i.e., polyamic acid solutions having lower viscosity than solutions prepared from non-end-capped polyamic acids. These improved materials can provide solutions of substantially the same or lower viscosity as polyamic acid solutions prepared from non-end-capped polyamic acids but at higher solids contents. This allows for substantial savings in manufacturing and solvent cost.

The monoanhydrides used in the practice of this invention may be represented by the general formula

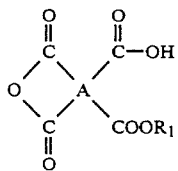

wherein A is a polyvalent aromatic group. The polyvalent aromatic group A is preferably one having one of the following structures:

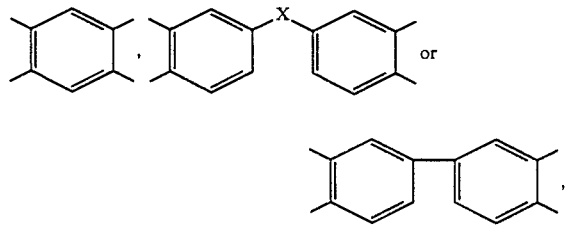

and $R_1$ is $C_1$ to $C_6$ linear or branched alkyl, $C_5$ to $C_8$ cycloalkyl or substituted or unsubstituted aryl, and X is at least one of the following:

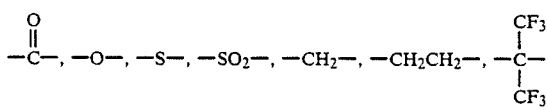

Suitable alkyl groups for $R_1$ include methyl, ethyl, n-propyl, n-butyl, t-butyl and the like.

When $R_1$ is cycloalkyl it is preferably cyclopentyl, cyclohexyl or cycloheptyl.

When $R_1$ is aryl it is preferably phenyl, 3- or 4-alkyl phenyl (where alkyl is defined above), 3- or 4-halophenyl, $C_1$ to $C_6$ alkoxyl phenyl (where the alkyl moiety of said alkoxy group is defined above) and the like. Where the term "halo" or "halogen" is used herein, such is defined as the group fluoro, chloro and bromo.

The following monoanhydrides are preferably used in the practice of this invention:

monomethyl ester of 1,2,4,5-benzenetetracarboxylic monoanhydride (also known as methyl ester of pyromellitic monoanhydride)
monoethyl ester of 1,2,4,5-benzenetetracarboxylic monoanhydride
monoisopropyl ester of 1,2,4,5-benzenetetracarboxylic monoanhydride
monomethyl ester of 3,3',4,4'-benzophenonetetracarboxylic monoanhydride
monoethyl ester of 3,3',4,4'-benzophenonetetracarboxylic monoanhydride
monoisopropyl ester of 3,3',4,4'-benzophenonetetracarboxylic monoanhydride
monobutyl ester of 3,3',4,4'-benzophenonetetracarboxylic monoanhydride
monoisobutyl ester of 3,3',4,4'-benzophenonetetracarboxylic monoanhydride
monomethyl ester of 2,2-bis(3,4-dicarboxyphenyl)hexafluoropropane monoanhydride
monoethyl ester of 2,2-bis(3,4-dicarboxyphenyl)hexafluoropropane monoanhydride
monoisopropyl ester of 2,2-bis(3,4-dicarboxyphenyl)hexafluoropropane monoanhydride
monoisobutyl 2,2-bis(3,4-dicarboxyphenyl)hexafluoropropane monoanhydride
monoisobutyl ester of 2,2-bis(3,4-dicarboxyphenyl)hexafluoropropane monoanhydride
monomethyl ester of oxydiphthalic monoanhydride
monoethyl ester of oxydiphthalic monoanhydride
monoisopropyl ester of oxydiphthalic monoanhydride
monomethyl ester of biphenyl-3,3',4,4'-tetracarboxylic monoanhydride
monoethyl ester of biphenyl-3,3',4,4'-tetracarboxylic monoanhydride
monoisopropyl ester of biphenyl-3,3',4,4'-tetracarboxylic monoanhydride Other monoanhydrides which may be used include:
monopropyl ester of 1,2,4,5-benzenetetracarboxylic monoanhydride
mono-tert-butyl ester of 1,2,4,5-benzenetetracarboxylic monoanhydride
mono-sec-butyl ester of 1,2,4,5-benzenetetracarboxylic monoanhydride
propyl ester of 3,3',4,4'-benzophenonetetracarboxylic monoanhydride
tert-butyl ester of 3,3',4,4'-benzophenonetetracarboxylic monoanhydride
sec-butyl ester of 3,3',4,4'-benzophenonetetracarboxylic monoanhydride
propyl ester of 2,2-bis(3,4-dicarboxyphenyl)hexafluoropropane monoanhydride
tert-butyl ester of 2,2-bis(3,4-dicarboxyphenyl)hexafluoropropane monoanhydride
sec-butyl ester of 2,2-bis(3,4-dicarboxyphenyl)hexafluoropropane monoanhydride
propyl ester of oxydiphthalic monoanhydride
sec-butyl ester of biphenyl-3,3',4,4'-tetracarboxylic monoanhydride Suitable dianhydrides are those corresponding to the monoanhydrides shown above, i.e. having the nucleus A but bearing two anhydride functions. These can be illustrated by the following: pyromellitic dianhydride; 2,3,6,7-naphthalene tetracarboxylic dianhydride; 3,3',4,4'-biphenyltetracarboxylic dianhydride; 1,2,5,6-naphthalenetetracarboxylic dianhydride; 2,2',3,3'-biphenyltetracarboxylic dianhydride; 3,3',4,4'-benzo phenonetetracarboxylic dianhydride; 2,2-bis(3,4-dicarboxyphenyl)propane dianhydride; bis(3,4-dicarboxyphenyl)sulfone dianhydride; 3,4,9,10-perylenetetracarboxylic dianhydride; 1,1-bis(2,3-dicarboxyphenyl)ethane dianhydride; 1,1-bis(3,4-dicarboxyphenyl)ethane dianhydride; bis(2,3-dicarboxyphenyl)methane dianhydride; bis(3,4-dicarboxyphenyl)methane dianhydride; bis(3,4-dicarboxyphenyl)sulfone dianhydride; and the like.

Suitable diamines include those of the formula H$_2$N—R—NH$_2$ where R is a divalent benzenoid radical selected from the group consisting of:

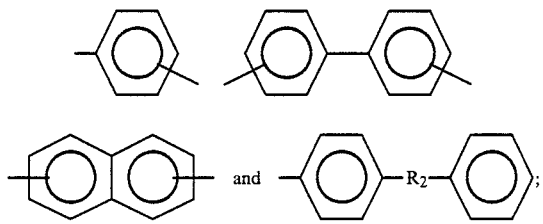

R$_2$ is selected from the group consisting of optionally substituted (e.g., with halogen, alkyl or haloalkyl) alkylene chain having 1 to 3 carbon atoms, an aryl group, —O—, —S—, —SO$_2$—,

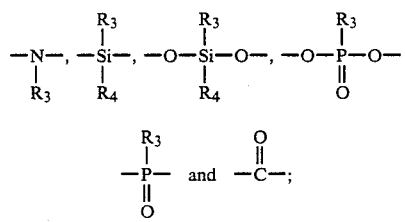

and R$_3$ and R$_4$ are selected from the group consisting of C$_1$ to C$_6$ alkyl and aryl.

Particularly preferred diamines are 2,2-bis[4-(4-aminophenoxy)phenyl]hexafluoropropane (4-BDAF) and 2,2-bis[4-(3-aminophenoxy)phenyl]hexafluoropropane (3-BDAF).

Because the polyamic acids of this invention find particular use as intermediates for preparation of polyimides, it is desirable to produce such intermediates with an appropriate concentration of free carboxylic acid end-capping agent. When concentrations of such end-capping agent are reduced past a critical point then the resulting intermediate polyamic acids loses its desirable processing properties, i.e., low viscosity at high solids content solutions. Thus, when the mole percent of the monoanhydride of this invention is 2 mole % or less based on mole % of aromatic diamine, then the resulting polyamic acid made from reacting the diamine with the combination of dianhydride and monoanhydride produces undesirable processing properties. Similarly amounts of monoanhydride exceeding 10 mole percents will produce undesirable low molecular weight polyamic acids. A preferred range for such end-capping agent is greater than about 2.0 to about 8.0 mole %. It should be understood however mole ratios of aromatic diamine to the combination of dianhydride plus monoanhydride should be about 1:1.

Solvents suitable for use in this invention are dipolar aprotic solvents such as those of the N,N-dialkylcarboxylamide class. Preferred solvents include the lower molecular weight members of such carboxylamides, particularly, N,N-dimethylformamide and N,N-dimethylacetamide. Other useful compounds of this class of solvents are N,N-diethylformamide and N,N-diethylacetamide. Other solvents which may be used in the present invention are dimethylsulfoxide, N-methyl-2-pyrrolidone, tetramethyl urea, dimethylsulfone, hexamethylphosphoramide, tetramethylene sulfone, and the like. The solvents can be used alone, in combinations of solvents, or in combinations with poor solvents such as benzene, benzonitrile, dioxane, etc.

To prepare the polyamic acids of this invention several different procedures may be used. A particularly desirable procedure, especially when conducting the process on the laboratory scale, is to form an essentially equimolar mixture of for example (a) 4-BDAF (2,2-bis[4-(4-aminophenoxy)phenyl]hexafluoropropane) and/or 3-BDAF (2,2-bis[4-(3-aminophenoxy)phenyl]hexafluoropropane) with (b) a dianhydride of an aromatic tetracarboxylic acid or any mixture of dianhydrides of two or more tetracarboxylic acids and a monoanhydride of an aromatic polycarboxylic acid having one free carboxylic acid group and one free carboxylic acid ester in an excess quantity of the solvent, preferably a solvent containing at least 10% by weight of a dipolar aprotic solvent. The molar concentration of the monoanhydride in these reactions should be greater than 2.0 mole % of the diamine but should not exceed 10 mole %. In any such procedure care should be taken to avoid exposure of the reactants to excessive heat as this could result in premature polyimide formation, which is undesirable.

Conversion of the end-capped polyamic acid to polyimide is accomplished by a thermal conversion process. Usually, this is a two-step process, the first step of which involves heating the polyamic acid at a temperature of above about 50° C. and below about 150° C. to remove most of the solvent. The second step involves heating the polyamic acid to a higher temperature (e.g., at least about 220° C.). At or above about 220° C., conversion of polyamic acid to polyimide is completed and chain extension (occurring as a result of carboxylic acid and ester group reactions with free amino groups) occurs. It is believed that chain extension occurs almost immediately at this temperature, so, holding the composition at this temperature for as short a period of about 10 minutes to about 60 minutes at 300°–350° C. should be sufficient. The process of this invention is further illustrated by the following examples.

EXAMPLE 1 (GENERAL PROCEDURE)

A solution of 2,2-bis[4-(4 aminophenoxy)phenyl]hexafluoropropane (4-BDAF) is dissolved in N-methyl-2-pyrrolidone (NMP) and heated under nitrogen to about 70° C. before adding an equimolar amount of pyromellitic dianhydride (PMDA) or benzophenonetetracarboxylic dianhydride (BTDA) and pyromellitic monoanhydride monomethyl ester (PMME). When addition is complete, the reaction mixture is stirred at about 80° C. for approximately two hours.

EXAMPLES 2 and 3

Following the general procedure illustrated in Example 1, the following polyamic acid preparations are made:

TABLE I

Preparation of Polyamic acids End-capped with PMME

| | Example No. | |
|---|---|---|
| | 2 | 3 |
| 4-BDAF[A] | 31.71 g | 42.27 g |
| PMDA[B] | 11.99 g | 15.92 g |
| PMME | 1.78 g[C] | 2.33 g[D] |
| Mole % PMME[E] | 7.2 mole % | 8.9 mole % |
| NMP[F] | 96.23 g | 35.03 g |
| NMP rinse[F] | 9.92 g | 10.03 g |
| CH[G] | — | 45.02 g |
| ηinh[H] | 0.30 dL/g | 0.24 dL/g |
| Bulk viscosity[I] | 2,600 cp | 64,000 cp |

[A]99.9 wt % pure
[B]Pyromellitic dianhydride contained 0.39 wt % pyromelletic monoanhydride (PMMA) after heat treatment at 190° C.
[C]As mixture containing 61.3 wt % pyromellitic anhydride monomethyl ester (PMME), 4.2 wt % PMDA, 24.5 wt % pyromellitic anhydride dimethyl ester (PMDE), and 10.0 wt % inert solvent
[D]As mixture containing 78.0 wt % PMME, 5.6 wt % PMDA, 6.9 wt % PMDE, and 9.5 wt % inert solvent
[E]Relative to moles of 4-BDAF
[F]N-methylpyrrolidone, contained trace amounts of water
[G]Cyclohexanone, contained trace amounts of water
[H]Conc. = 0.5 g/dL in NMP
[I]Cone/plate method at 25° C.

TABLE II

Physical Properties of Polyimides Prepared From PMME End-capped Polyamic Acids

| Ex | Isothermal TGA Wt. Loss[A] | Decomposition[B] Temperature °C. | 10% Wt. Loss[B] Temperature °C. | Adhesion[C] |
|---|---|---|---|---|
| 2 | 2.9 | 568 | 550 | — |
| 3 | 3.2 | 566 | 548 | good |

[A]TGA at 450° C., air, 1 hour.
[B]TGA, RT-700° C., nitrogen, 10° C./min.
[C]Cross-hatch with tape peel.

We claim:

1. A process for preparing a polyamic acid comprising contacting a solution of an aromatic diamine in a suitable solvent with a dianhydride of an aromatic tetracarboxylic acid and a monoanhydride of an aromatic tetracarboxylic acid having one free carboxylic acid moiety and one free carboxylic acid ester moiety, said monoanhydride being at least greater than 2.0 mole percent of said diamine and the total mole ratio of said aromatic diamine to said dianhydride and monoanhydride being about 1:1.

2. The process of claim 1 wherein said aromatic diamine is selected from the group 2,2-bis[4-(4-aminophenoxy)phenyl]hexafluoropropane, 2,2-bis[4-(3-aminophenoxy)phenyl]hexafluoropropane and mixtures thereof.

3. The process of claim 1 wherein said dianhydride of an aromatic tetracarboxylic acid is selected from the group 2,2-bis(2,4-dicarboxyphenyl)hexafluoropropane dianhydride, pyromellitic dianhydride, 3,3',4,4'-benzophenone tetracarboxylic acid dianhydride and mixtures thereof.

4. The process of claim 1 wherein said monoanhydride of an aromatic tetracarboxylic acid is $$\begin{array}{c} O \\ \| \\ C \\ O \diagup \diagdown A \diagdown \\ \diagdown C \diagup \diagup \diagdown COOR_1 \\ \| \\ O \end{array} \begin{array}{c} O \\ \| \\ C-OH \end{array}$$

where A is

[structures: phenylene, or diphenyl ether with X linkage, or biphenyl]

and $R_1$ is $C_1$ to $C_6$ linear or branched alkyl, $C_5$ to $C_8$ cycloalkyl, or substituted or unsubstituted aryl, and X is at least one of $$-\overset{O}{\underset{\|}{C}}-, -O-, -S-, -SO_2-, -CH_2-, -(CH_2)_2-, \text{ or}$$

$$-C(CF_3)_2-.$$

5. The process of claim 4 wherein $R_1$ is an alkyl selected from the group methyl, ethyl and n-propyl.

6. The process of claim 5 wherein said aromatic diamine is 2,2-bis[4-(4-aminophenoxy)phenyl]hexafluoropropane.

7. A process for forming a polyimide comprising contacting a solution of an aromatic diamine in a suitable solvent with a dianhydride of an aromatic tetracarboxylic acid and a monoanhydride of an aromatic tetracarboxylic acid having one free carboxylic acid moiety and one free carboxylic acid ester moiety said monoanhydride being at least greater than 2.0 mole percent of said diamine and the total mole ratio of said aromatic diamine to said dianhydride and monoanhydride being about 1:1; and heating the resulting mixture at a temperature sufficient to remove the solvent and form the polyimide.

8. The process of claim 7 wherein said aromatic diamine is selected from the group 2,2-bis[4-(4-aminophenoxy)phenyl]hexafluoropropane, 2,2-bis[4-(3-aminophenoxy)phenyl]hexafluoropropane and mixtures thereof.

9. The process of claim 7 wherein said dianhydride of an aromatic tetracarboxylic acid is selected from the group 2,2-bis(2,4-dicarboxyphenyl)hexafluoropropane dianhydride, pyromellitic dianhydride, 3,3',4,4'-benzophenonetetracarboxylic acid dianhydride and mixtures thereof.

10. The process of claim 7 wherein said monoanhydride of an aromatic polycarboxylic acid is $$\begin{array}{c} O \\ \| \\ C \\ O \diagup \diagdown A \diagdown \\ \diagdown C \diagup \diagup \diagdown COOR_1 \\ \| \\ O \end{array} \begin{array}{c} O \\ \| \\ C-OH \end{array}$$

where A is

[structures: phenylene, or diphenyl with X linkage, or]

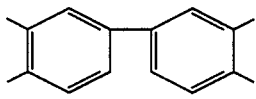

and $R_1$ is $C_1$ to $C_6$ linear or branched alkyl, $C_5$ to $C_8$ cycloalkyl, or substituted or unsubstituted aryl and X is at least one of

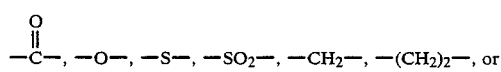

$-C(CF_3)_2-$.

11. The process of claim 10 wherein $R_1$ is a lower alkyl selected from the group methyl, ethyl and n-propyl.

12. The process of claim 11 wherein said aromatic diamine is 2,2-bis[4-(4-aminophenoxy)phenyl]hexafluoropropane.

13. The process of claim 7 wherein the temperature is above 50° C. and below 150° C. for a time sufficient to remove the solvent.

14. The process of claim 13 wherein the temperature is further raised to at least 220° C.